(12) United States Patent
Yuan et al.

(10) Patent No.: US 10,372,928 B2
(45) Date of Patent: Aug. 6, 2019

(54) SYSTEM, METHOD, AND APPARATUS FOR DATA ACCESS IN A CLOUD COMPUTING ENVIRONMENT

(71) Applicant: ALIBABA GROUP HOLDING LIMITED, George Town, Grand Cayman (KY)

(72) Inventors: Panfeng Yuan, Beijing (CN); Dong Guo, Beijing (CN); Wei Zhang, Beijing (CN); Zihua Pan, Hangzhou (CN); Tingliang Chen, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 90 days.

(21) Appl. No.: 15/246,303

(22) Filed: Aug. 24, 2016

(65) Prior Publication Data

US 2017/0061149 A1    Mar. 2, 2017

(30) Foreign Application Priority Data

Aug. 24, 2015   (CN) .......................... 2015 1 0524489

(51) Int. Cl.
*G06F 21/62* (2013.01)
*H04L 29/06* (2006.01)
*H04L 29/08* (2006.01)

(52) U.S. Cl.
CPC ........ *G06F 21/6218* (2013.01); *H04L 63/102* (2013.01); *G06F 2221/2117* (2013.01); *G06F 2221/2141* (2013.01); *H04L 63/101* (2013.01); *H04L 67/10* (2013.01)

(58) Field of Classification Search
CPC ......... G06F 21/6218; G06F 2221/2117; G06F 2221/2141; H04L 63/102; H04L 67/10; H04L 63/101
See application file for complete search history.

(56) References Cited

U.S. PATENT DOCUMENTS 9,152,603 B1    10/2015   Kelly, III
9,438,491 B1    9/2016    Kwok et al.
2014/0075571 A1*  3/2014  Jackson ............ G06F 17/30292
                                                                     726/28

(Continued)

FOREIGN PATENT DOCUMENTS

CN    104468641 A    3/2015
CN    105117938 A    12/2015

(Continued)

OTHER PUBLICATIONS

PCT International Search Report and Written Opinion dated Nov. 3, 2016, issued in corresponding International Application No. PCT/US16/48451 (7 pages).

*Primary Examiner* — Abiy Getachew
(74) *Attorney, Agent, or Firm* — Finnegan, Henderson Farabow, Garrett & Dunner, LLP

(57) ABSTRACT

A data access method in a cloud computing environment is disclosed. The method may comprise, in a service object space of the cloud computing environment, receiving a request of a user for accessing a data package, the request including a user identification, determining a service object space of the data package corresponding to the request, and providing the data package to the user according to the service object space of the data package and the user identification.

17 Claims, 6 Drawing Sheets

(56) References Cited

U.S. PATENT DOCUMENTS

| | | | |
|---|---|---|---|
| 2014/0082131 A1* | 3/2014 | Jagtap | .................. G06F 9/5072 709/217 |
| 2015/0074743 A1 | 3/2015 | Illieva et al. | |
| 2015/0227414 A1 | 8/2015 | Varma | |
| 2016/0088056 A1 | 3/2016 | Ghosh et al. | |
| 2016/0164826 A1 | 6/2016 | Riedel et al. | |
| 2016/0202917 A1 | 7/2016 | Apotovsky et al. | |
| 2016/0217041 A1 | 7/2016 | Resch | |
| 2016/0246481 A1 | 8/2016 | Dakua et al. | |

FOREIGN PATENT DOCUMENTS

| | | |
|---|---|---|
| CN | 105187455 A | 12/2015 |
| CN | 105282145 A | 1/2016 |
| CN | 105302920 A | 2/2016 |
| CN | 105549905 A | 5/2016 |
| WO | WO 2016/135534 A1 | 9/2016 |

* cited by examiner

SYSTEM, METHOD, AND APPARATUS FOR DATA ACCESS IN A CLOUD COMPUTING ENVIRONMENT

CROSS REFERENCE TO RELATED APPLICATION

The present application is based on and claims the benefit of priority to Chinese Application No. 201510524489.7, filed Aug. 24, 2015, the entire contents of which are incorporated herein by reference.

TECHNICAL FIELD

The present application relates to the technical field of data processing, and more particularly, to a data access method and a data access apparatus in a cloud computing environment.

BACKGROUND

The world is ushering in the era of big data. Data has become a strategic resource with an important economic value, capturing the attention of governments and enterprises in various countries. Although big data storage and mining techniques have been gradually developing, a great number of data silos still exist. These data silos, however, restrict data flow and liquidity. One of the more interesting developments for big-data environments involves integrating various types of data to provide a full range of three-dimensional graphics data, and to rebuild a user model from a system perspective. The "openness" and "mobility" of data has become the key points for value-creation from the data. Therefore, issues about data ownership, usage, pricing, and transaction have been continuously discussed in this field.

In the era of big data, data is exchanged and integrated across different organizations, and can be turned into a commodity or a raw material for secondary development, exchange, and manipulation. Accordingly, data transaction systems have emerged, driving the development of big data industry. In the data transaction systems, data authorization and accessing issues are still of concern to those in the industry.

Although data transaction systems have been adopted, these data transaction systems still have many defects: 1. data transactions may be authorized by multiple parties, which results in complicated relations at an uncontrollable scale and a lack of effective data management mechanisms; and 2. previous technologies were based on the public cloud and do not offer an efficient method for controlling data on a private cloud.

SUMMARY

One aspect of the present disclosure is directed to a data access method in a cloud computing environment. The method may comprise, in a service object space of the cloud computing environment, receiving a request of a user for accessing a data package, the request including a user identification, determining a service object space of the data package corresponding to the request, and providing the data package to the user according to the service object space of the data package and the user identification.

Another aspect of the present disclosure is directed to a non-transitory computer readable medium storing one or more programs, the one or more programs comprising instructions which, when executed by a processor of a computer system, cause the computer system to perform a method. The method may comprise, in a service object space of the cloud computing environment, receiving a request of a user for accessing a data package, the request including a user identification, determining a service object space of the data package corresponding to the request, and providing the data package to the user according to the service object space of the data package and the user identification.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Figure 1:
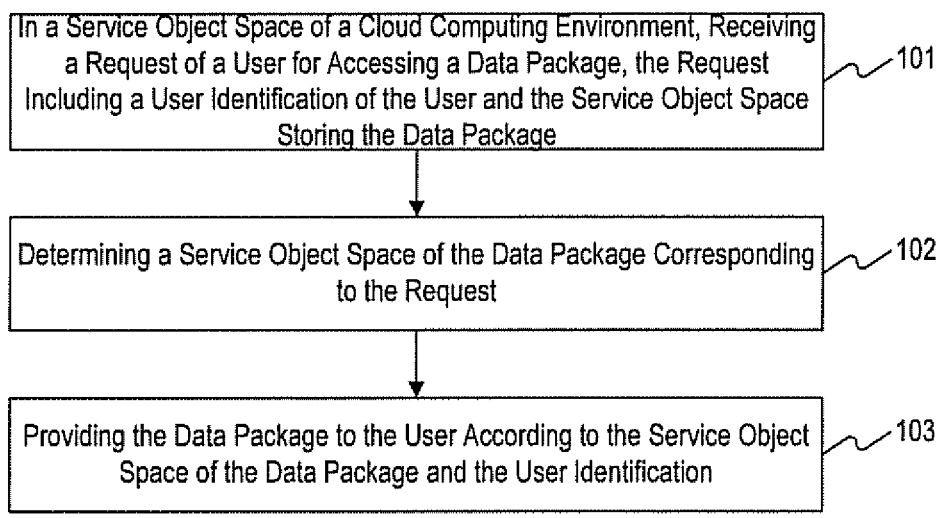
FIG. 1 is a flow diagram illustrating a method for data access under a cloud computing environment, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present disclosure do not represent all implementations. Instead, they are merely examples of systems and methods consistent with aspects related to the invention as recited in the appended claims.

With respect to current data authorization methods and systems in a cloud computing environment, data is generally authorized within a closed enterprise environment, without considering data exchange scenarios across different organizations (project spaces). Thus, the data authorization solutions are relatively simple. For example, in a big data analysis platform Hadoop, a Linux account can be assigned to each user in the platform, and an administrator of the platform authorizes designated access levels to the Linux accounts. Thus, each user can access the data of the platform according to the designated authorization, e.g., access level, corresponding to the Linux account.

The current data authorization methods and systems, however, do not offer a multi-tenancy, multi-project space hierarchical architecture. Accordingly, the data authorization systems do not contemplate the concept of cross-tenants (project spaces). The data authorization relations are many-to-many complicated relations, do not involve a hierarchical structure, and are completely controlled by the administrator. It lacks an efficient data authorization solution in cross-organization data exchanging scenarios, and especially in a public cloud scenario, which could cause confusion when several users access the data.

In some embodiments of the present application, a solution is disclosed to manage authorization relations across different tenants (project spaces) in a hierarchy. The data provider and the data user may respectively manage their data authorization relations. The data provider may care about which tenants to be authorized access to the data. The data user may care about which project spaces and which members in the project spaces within the tenant are authorized. The embodiments of the present application can, based on a cloud-computing data transaction platform, both provide computation resource control, and provide big data opening service and development service based on the data, and further support multi-party authorization transactions. In some embodiments of the present application, access levels can be assigned to users. When one of the user accesses the data under a certain project space, the user's access authorization can be determined according to the project space of the user and the project space of the data to be accessed by the user, thereby providing corresponding access services to the user.

FIG. 1 is a flow diagram illustrating a method 100 for data access under a cloud computing environment, consistent with embodiments of the present disclosure. The cloud computing environment may include one or more service object spaces respectively storing data packages.

In some embodiments of the present application, the service object space may refer to an organization distributed in a cloud environment. The service object space can also be called a project space and may belong to a public cloud or a private cloud. Different project spaces can respectively store data packages. The public cloud may support authorization to exchange data across different organizations, and may correspond to external data packages. The private cloud may support authorization to internal users, and may correspond to internal data packages.

In a project space, a data provider may provide a data package in its project space to an internal member of the project space, or to an external member of the project space. In some embodiments, the data provider may be a seller providing the data package. An external member of the project space, who is provided with the data package, is called a tenant. In some embodiments, the tenant can be a buyer, e.g., a purchaser, of the data package. When authorized by the data provider, the tenant may further provide the data package to another tenant. Data packages in the project space can be managed by a project administrator designated by the data provider.

Data concepts involved in the embodiments of the present application are explained below.

Data: a broad concept, which includes, for example, a data table, a user-defined function (e.g., mapreduce, a programming model function), a data service, a report form, and so on.

Data package: a collection of data, and may include one or more of the following types:

1. Internal data package: a data package used within a project space, authorized by a project administrator to an internal member of the project space, and used by the internal member.

2. External data package: a data package used between project spaces, authorized between project spaces of tenants, can be sold on a data market, and may include:

a) Intra-tenant data package: a data package authorized and used by a tenant between project spaces;

b) Inter-tenant data package: a data package authorized, by a tenant, between different project spaces and can be sold on a data market; and c) Data package through an intermediary agent: a data package sold between an official tenant (a tenant on a data transaction platform) and another tenant on a data market.

In some embodiments, an inter-tenant data package must be a data package between different project spaces. In addition, a data package between different project spaces is not necessarily an inter-tenant data package, since one tenant may have many project spaces, and an intra-tenant data package may also be authorized across project spaces. The data package under an intermediary agent may be a special form of an inter-tenant data package. That is, it may also belong to a data package authorized across project spaces, but may have a special authorization mode, e.g., its authorization involves three parties, a data transaction platform, a data provider, and a data user.

The method 100 may be performed by a computer system. The computer system may comprise a processor and a non-transitory computer-readable storage medium storing instructions that, when executed by the processor, perform the steps described below. The method 100 may include the following steps:

Step 101 includes, in a service object space of the cloud computing environment, receiving a request of a user for accessing a data package, the request including a user identification of the user.

In some embodiments, a user identification refers to a user account or other identification in a cloud environment for identifying a user. If a request for accessing a data package is received in a certain project space, a user identification in the access request can be extracted first, to determine the user's identity, thereby providing a corresponding access to the user.

Step 102 includes determining a service object space of the data package corresponding to the request.

In some embodiments, the data package may include an internal data package of the service object space and an external data package of the service object space. Step 102 may include the following sub-steps:

Sub-step S11*a* can include determining whether the data package corresponding to the request is a data package of a current service object space; if yes, performing Sub-step S12*a*, and if not, performing Sub-step S13*a*;

Sub-step S12*a* can include determining that the data package corresponding to the request is an internal data package of the service object space; and Sub-step S13*a* can include determining that the data package corresponding to the request is an external data package of the service object space.

In some embodiments, through a certain project space, the user may access a data package in the project space, or access a data package in other project spaces. Thus, after a project space receives a request for accessing a data package, the project space may further determine the data package to be accessed in the request is an internal data package of the project space or an external data package of other project spaces.

Step 103 includes providing the data package to the user according to the service object space of the data package and the user identification.

In some embodiments, the data authorization scenarios may fall into two categories, with one category being intra-project-space authorization, and the other being cross-project-space authorization. The intra-project-space authorization may include an A type. The cross-project-space authorization may include an AA type, an AB type, and an ABC type. The data packages involved in the A type are internal data packages. The data packages involved in the AA, AB, and ABC types are all external data packages. The A, AA, AB, and ABC types are introduced below.

A Type: including a shared-type and an isolated-type, referring to data authorization within a project space.

For the A type, the data package can be provided for internal members; that is, the data package can be used within a project space, and a project administrator may authorize the data package to be used by internal members of the project space.

AA Type: involving authorization by two parties (intra-tenant and cross-project-space data authorization).

AB Type: involving authorization by two parties (cross-tenant and cross-project-space authorization). A data provider may release the data to be used by other data users (tenants), and after the tenant acquires (e.g., buys) the data, the tenant can directly use the full data.

For the AB type, only two parties are needed during data authorization. Compared with the ABC type (further described below), the AB type can obtain the full data. The AB type can be further classified into two kinds: one in which both the developer and the producer can obtain the full data; and the other in which the developer can only acquire the data after sampling, whereas the producer can obtain the full data. When selling the data, the data provider may select from the above kinds.

ABC Type: authorization involving three parties (cross-tenant and cross-project-space authorization). An official tenant (a tenant on a data transaction platform) may release data to the developer (a tenant) to perform data application, and after the developer acquires the data, the developer can only obtain the corresponding data secondarily authorized by the data provider (e.g., seller), rather than obtaining the full data.

In one example describing the ABC type, it is assumed that, an official tenant on a certain data transaction platform releases merchant data, e.g., shop traffic data of all merchants on Taobao. Then, an ISV (Independent Software Vendor) may develop an App for the merchants, and the merchants may subscribe to the App to run the shops. When various ISVs come to the data transaction platform to buy the shop traffic data of merchants, each ISV can only obtain shop traffic data of the merchants who subscribe to the App developed by the corresponding ISV. In addition, under a developing environment, the ISV can only obtain a sample data after sampling.

In some embodiments, the "full data" in the AB type is distinguished from the ABC type. With reference to the above cited example, for the ABC type authorization, it is assumed that, the data provider's data selling table has 1 million records (the "full data"), and after a certain tenant acquires the data, the tenant may only obtain 100 thousands records regarding the subscribed merchants out of the 1 million records.

In some embodiments, all tenants (including an official tenant) can put data on sale at the data transaction platform, or buy data from the other tenants and use the data. Data for sale may be classified according to various subjects, each subject may contain many tables, and the data can be traded based on each table. The above mentioned types of AA, AB, and ABC are all directed to different situations of a data table.

In some embodiments of the present application, the one or more service object spaces may include one or more service object types. Data packages of the one or more service object spaces may have the corresponding service object types. According to the user identification, the service object type may be configured with a first access authorization. Step 103 may include the following sub-steps:

Sub-step S11*b* can include, if the data package is an internal data package of the service object space, using the user identification to determine that the user has a first access authorization;

Sub-step S12*b* can include determining a service object type corresponding to the internal data package of the service object space; and Sub-step S13*b* can include, under the service object type, using the first access authorization to provide the internal data package of the service object space to the user.

In some embodiments, the project space may be classified into one or more service object types. According to a service object type of the project space of the data requested to be accessed by the user, the user may use different access authorizations to access the internal data package of the project space.

In some embodiments, the service object type may include a development type service object and a production type service object. The user's access authorization in the development type service object may include a shared-type authorization and an isolated-type authorization. The first access authorization may include reading, writing, and management. Sub-step S13 may include the following sub-steps:

Sub-step S13-1 can include, in the development type service object, if the user's access authorization is the shared-type authorization, permitting the user to read/write an internal data package in the development type service object;

Sub-step S13-2 can include, in the development type service object, if the user's access authorization is the isolated-type authorization, permitting the user to read/write a designated internal data package in the development type service object; and Sub-step S13-3 can include, in the production type service object, permitting the user to read/write an internal data package in the development type service object, but prohibiting the user from managing the internal data package in the development type service object.

Figure 2:
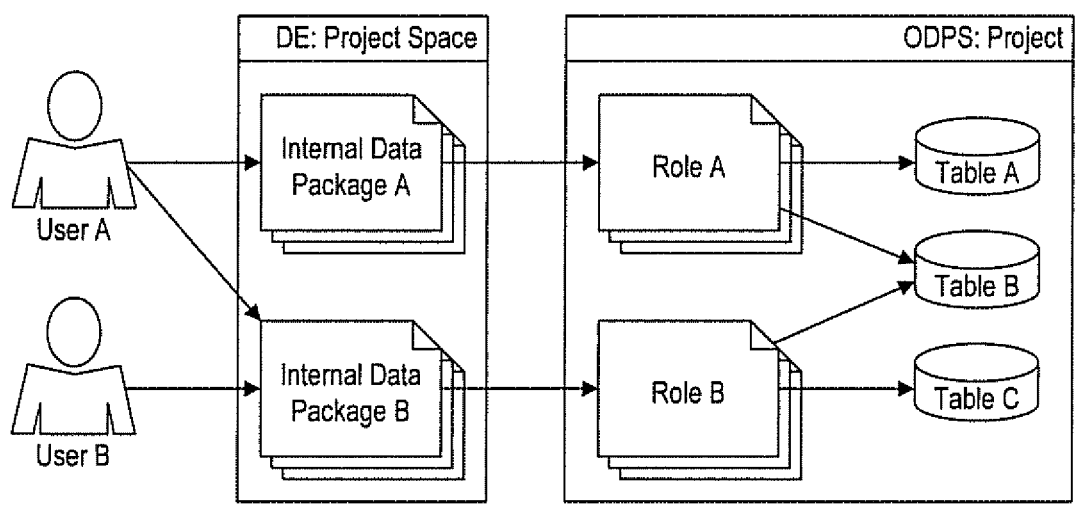
FIG. 2 is a graphical illustration of an intra-project-space authorization, consistent with embodiments of the present disclosure.

FIG. 2 is a graphical illustration of an intra-project-space authorization, according some embodiments of the present disclosure. The project space may include an ODPS (Open Data Processing Service) and a DE (Data Engine). In the project space, one data package may correspond to one role, which is authorized to access (e.g., reading, writing) of data or data table in the data package. These relationships between the users, the data packages, the roles and the tables are represented by the arrows.

Under the situation of intra-project-space authorization, the intra-project-space authorization may include the following features:

(1) A project administrator creates in advance data packages classified according to internal user groups of the project space or according to a cohesion feature of the data. For example, two kinds of members exist, a data developer and a data analyzer. Different data packages can be created respectively: a data package A can read and write all tables in the project, and is authorized to the data developer; and a data package B can only read designated tables in the project and is authorized to the data analyzer for making analysis.

(2) The project administrator actively authorizes the data package to the user, or the user actively applies to join. The user may not need to apply for an access authorization directed to a single data table.

(3) Regardless of whether data tables in the data package of the project space contain sensitive fields, they are authorized based on whole tables. That is, when a user applies for access to a data package of the project space, the user does not need to apply for an access by each field in the data table.

(4) Main tasks of the project administrator only involve creating and maintaining data packages, continuously adding data tables into the data packages, and deleting data tables from the data packages.

In some embodiments, under the intra-project-space authorization, the types of the project space may include a development type and a production type. That is, the project space includes a development environment (a development project) and a production environment (a production project). Furthermore, the access authorization may be classified according to the type, and on this basis, the access authorization may be further classified. For example, under a development project, the authorization may be further classified into a shared-type authorization and an isolated-type authorization.

In some embodiments with respect to a development project, if the user's access authorization is a shared-type authorization, the user may be permitted to read and write to a data package in the development project; if the user's access authorization is an isolated-type authorization, the user may be permitted to read and write a designated data package in the development project. In some embodiments with respect to a production project, the user is permitted to read and write to a data package in the production project, but prohibited from managing a data package in the production project. This may prevent over-authorization, thereby avoiding some problems caused by a mis-operation.

In some embodiments with respect to an intra-project-space authorization, the user can access a data package in a project space according to an access authorization assigned to the user or applied for by the user. In addition, based on different environments of the project space, different access authorizations may be configured accordingly. The project space may use an authorization mode based on whole tables. Even if a data package contains certain sensitive fields, the user does not need to apply for access to the data package by each field. For some sensitive fields in the data table inconvenient to access, the data table may be configured as accessible if the user gets appropriate permissions from the data provider, thereby enhancing data security.

In some embodiments with respect to the user identification, a designated access authorization may be configured. Step 103 may include the following sub-steps:

Sub-step S21 can include, if the data package is an external data package of the service object space, using the user identification to determine that the user has a designated access authorization; and Sub-step S22 can include using the designated access authorization to provide the external data package of the service object space to the user.

In some embodiments of the present application, an external data package of the service object space may include a designated field, and the external data package of the service object space may be provided by a data provider. Sub-step S22 may include the following sub-steps:

Sub-step S22-1 can include receiving a field access request to access an external data package of the service object space;

Sub-step S22-2 can include using the access authorization to send an approval request of the field access request to a data provider of the external data package of the service object space;

Sub-step S22-3 can include, if receiving an approval to the approval request to access the designated field from the data provider, permitting the user to access the external data package; and Sub-step S22-4 can include, if receiving a rejection to the approval request to access the designated field from the data provider, prohibiting the user from accessing the external data package.

Figure 3:
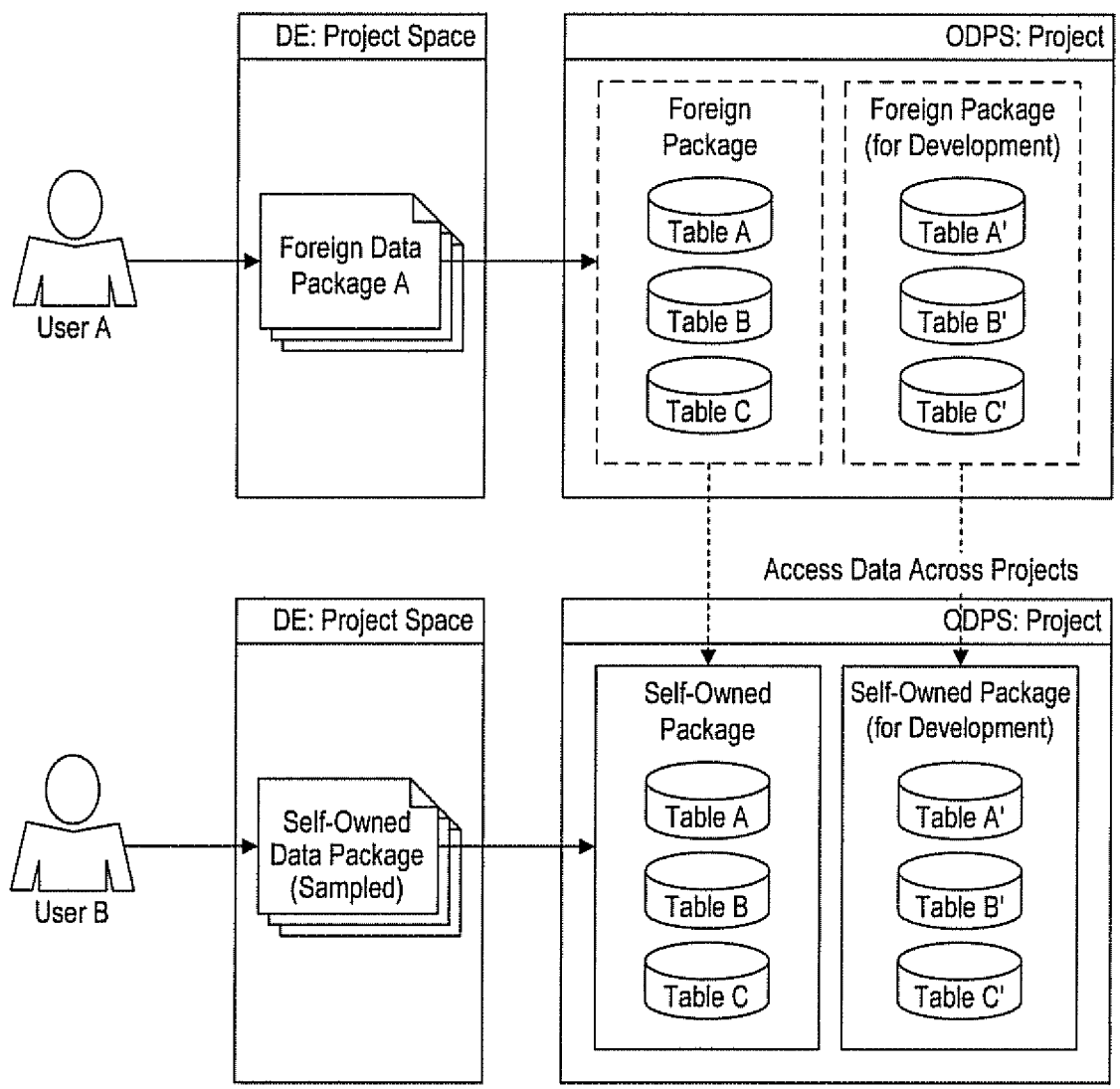
FIG. 3 is a graphical illustration of an AA/AB type cross-project-space authorization, consistent with embodiments of the present disclosure.

For the cross-project-space authorization, the authorization type may include an AA type, an AB type, and an ABC type. For the AA type and the AB type, referring to FIG. 3, FIG. 3 is a graphical illustration of an AA/AB type cross-project-space authorization, according to embodiments consistent with the present disclosure. Arrows and other illustrative representations in FIG. 3 may be similar to those described above in FIG. 2. The AA type and the AB type of cross-project-space authorization may include the following features:

(1) An administrator of a source project (project space), e.g., User B of FIG. 3, authorizes a data package to a target project.

(2) An administrator of the target project, e.g., User A of FIG. 3, possesses administration rights to foreign data tables (foreign data packages). Each foreign data package maps to one data package in a current project space. The authorization of the data package to internal users is determined by the administrator of the target project, and the source data owner (data provider) does not need to participate in the approval process, which reduces the administrator's burden.

(3) If the user intends to apply for access to a sensitive field in a foreign data table, a step of "approval by the source data owner" can be added to the approval process. That is, whether the foreign data table having a sensitive field accessible by the user needs to be determined by the source data owner's approval, to further determine whether the user is permitted to access the data table. After the source data owner permits the user to access the data table, the data can be provided to the user. The step of "approving by the source data owner" is merely a supplementary step, which is not essential. Alternatively, it may be defaulted that users are prohibited from accessing the sensitive field, or other accessing rules involving sensitive fields may be configured, which is not restricted in the embodiments of the present application.

(4) The data provider may trace and view information about secondary authorization of data tables provided to outsiders. For example, after the source project authorizes the target project, the source project may further check authorization information about re-authorizing the data to other tenants by the target project.

The effects of the AA type and the AB type include simplifying spider web data authorization relations among project spaces, and only one data package may exist between one project and another project, such that the boundaries between authorizations and obligations become clear. When a user accesses the data, once the user's access authorization is determined, a corresponding access service is provided to the user according to the assigned corresponding authorization.

In some embodiments of the present application, a corresponding subject can be configured for an external data package of the service object space, and a second access authorization is configured, directing to the user identification, the subject, and/or a preset authorization relation table. Step 103 may include the following sub-steps:

Sub-step S31 can include if the data package is an external data package of the service object space, using the user identification to determine that the user has a second access authorization; and Sub-step S32 can include using the second access authorization to provide an external data package of the service object space to the user.

Figure 4:
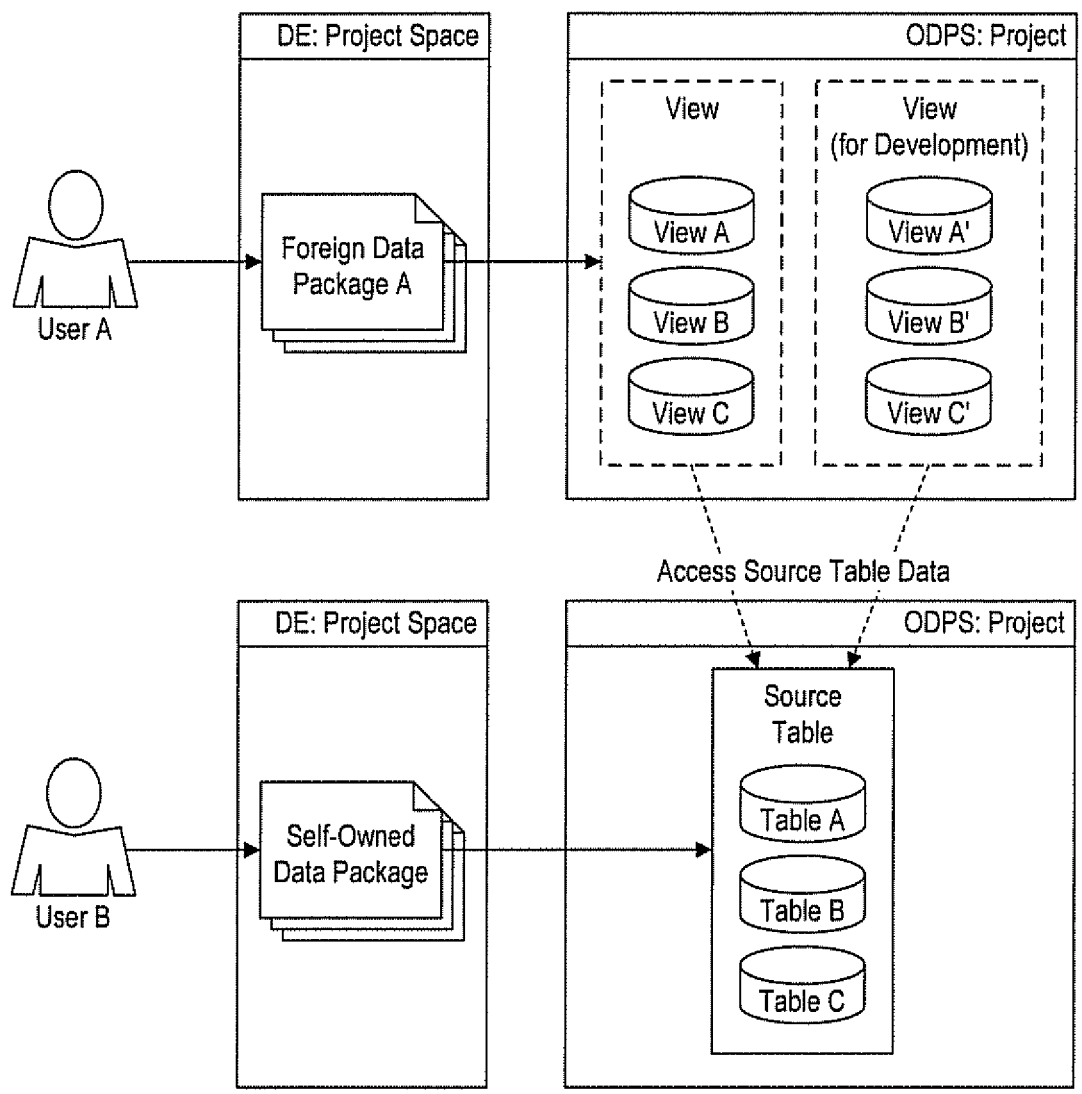
FIG. 4 is a graphical illustration of an ABC type in cross-project-space authorization, consistent with embodiments of the present disclosure.

For the ABC type in cross-project-space authorization, referring to FIG. 4, FIG. 4 is an exemplary graphical illustration of an ABC type in cross-project-space authorization, according embodiments of the present disclosure. Arrows and other illustrative representations in FIG. 4 may be similar to those described above in FIG. 2. In some embodiments, one project space may include a development environment and a production environment. The AA type and the AB type cross-project-space authorization may include the following features:

(1) An administrator of a source project, e.g., User B of FIG. 4, authorizes tables according to the data subject. Each data subject includes several tables. Each table corresponds to one view of a target project. Since authorizing relations of each target project are dynamically changed, and since once the data is applied for, most recent data needs to be used immediately, the relations cannot be pre-created. In some embodiments, the data subject is organizing and managing data in a data warehouse. The data subject is convenient for authorizing data (tables) in batches. For example, when a merchant sells data with a data traffic subject, the merchant can authorize all tables under this subject at one time.

(2) A user in the target project, e.g., User A of FIG. 4, accesses sample data in a development environment, and uses production data in a production environment, but cannot access production data in the development environment, which may be controlled by a data lineage tracing mechanism.

In some embodiments of the present application, according to the project space of the data requested to access by the user and the project space of the data, corresponding access can be provided to the user. Data authorization in the project space can be categorized as an intra-project-space authorization and a cross-project-space authorization. For the intra-project-space authorization, according to the type of the project space, different access authorizations, e.g. access levels, can be determined based on the users, and according to the access authorizations, corresponding accessing services are provided to the users. For the cross-project-space authorization, designated access authorizations can be determined based on the users, and according to the designated access authorizations, corresponding access services are provided to the user. In addition, when a user accesses data of a project space, and if the data is sensitive, an approval request regarding the user's access can be further sent to a data provider. The user may access the data according to an approval from the data provider, thereby enhancing data security.

Figure 5:
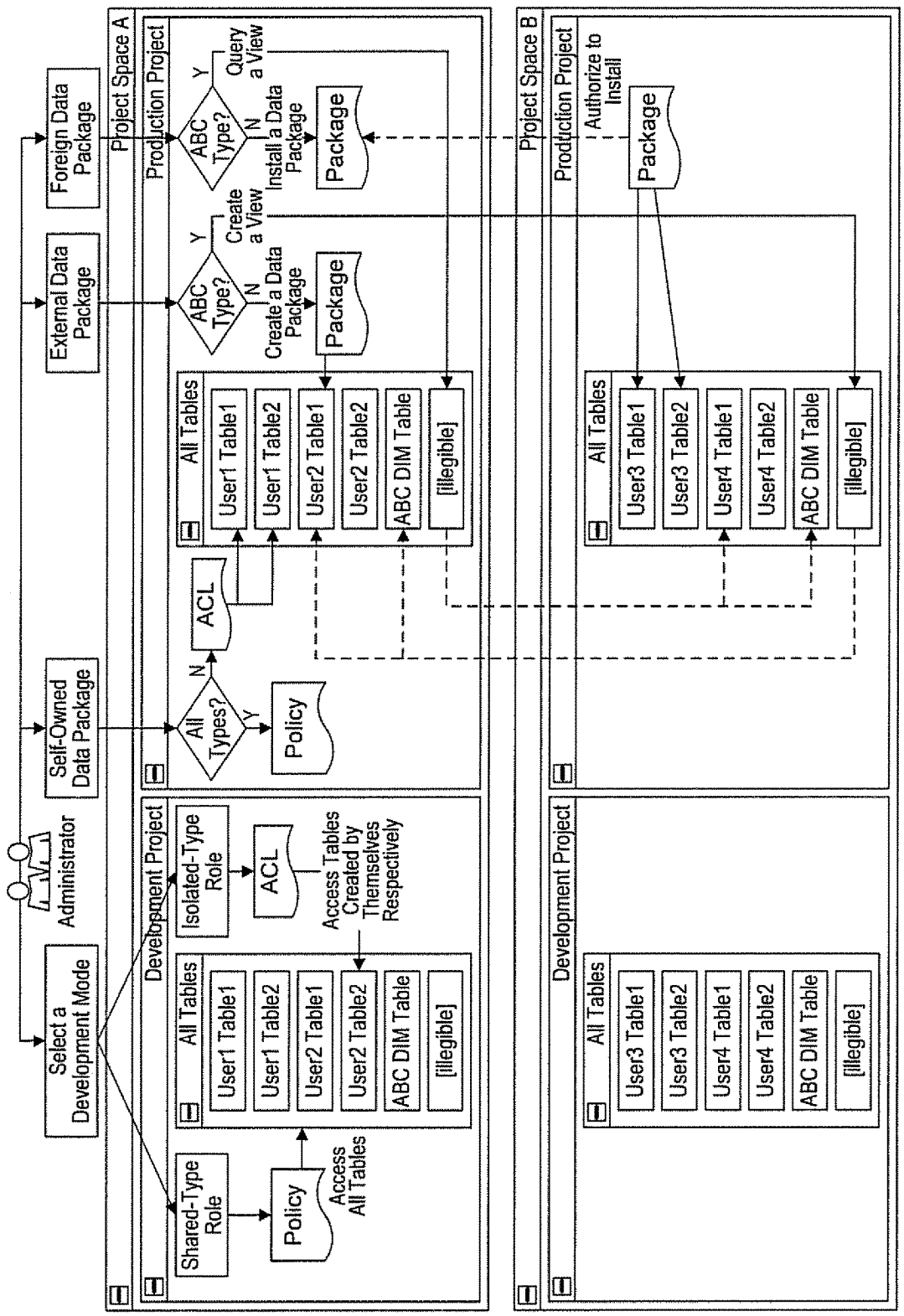
FIG. 5 is a graphical illustration of an overall flow of data authorization in a project space, consistent with embodiments of the present disclosure.

FIG. 5 is a graphical illustration of an exemplary flow of data authorization in a project space, according to embodiments consistent with the present disclosure. In some embodiments of the present application, the data authorization in the project space may include an intra-project-space authorization and a cross-project-space authorization.

I. Under the Intra-Project-Space Authorization:

The cross-project-space authorization includes the A type.

The types of the project space (such as Project Space A of FIG. 5) may include a development project and a production project. In some embodiments of the present application, based on different types, a user can be configured with the following access authorizations:

1. For the Development Project:

Under the "shared" type, the user can read and write to all tables in a development environment.

Under the "isolated" type, the user can only read and write to tables created by the user in the development environment.

2. For the Production Project:

When authorized by a self-owned data package, a mapping relation between the data package and the table can be maintained, which is further described below.

The self-owned data package may include an administrator authorizing data within the project space. The data of the project space may include a development project and a production project. In some embodiments, the above mentioned "share" type and "isolated" type may refer to methods of using data in the development project by various members, while the self-owned data package referring to data in the production project.

In some embodiments, the data authorization may include an ACL authorization and a Policy authorization. The ACL authorization and the Policy authorization are introduced below:

(1) The ACL authorization is an object-based authorization. Data authorized by ACL authorization can be taken as a sub-resource of the object. Only when the object has already existed, the ACL authorization operation may be performed. When the object is deleted, the data authorized by ACL authorization can be automatically deleted. The ACL authorization may support GRANT/REVOKE grammar similar to that defined in SQL92. By simple authorization statements, an authorization or cancellation of an authorization of existed project space objects can be completed. An ACL authorization record may include the following information: role, resource, and authorization.

For example:
USE test_project; —open the project space
ADD USER ALIYUN$alice@aliyun.com; —add a user
ADD USER ALIYUN$bob@aliyun.com; —add a user
CREATE ROLE worker; —create a role
GRANT worker TO ALIYUN$alice@aliyun.com; —assign a role
GRANT worker TO ALIYUN$bob@aliyun.com; —assign a role
GRANT CreateInstance, CreateResource, CreateFunction, CreateTable, List ON PROJECT test_project TO ROLE worker; —authorize the role (2) The Policy authorization can be used for more complicated authorization scenarios. The policy authorization is a body-based authorization. Data authorized through the Policy authorization, e.g., access policy, can be taken as a sub-source of the authorized body. When the body (user or role) exists, the Policy authorization operation can be performed. When the body is deleted, the data authorized through the Policy authorization can be automatically deleted. The Policy authorization may perform the authorization based on a self-defined access policy language, to permit the body to access the object of the project space or prohibit the body from accessing the object of the project space.

The Policy authorization may be a new authorization mechanism, to solve some complicated authorization scenarios that cannot be solved by the ACL authorization mechanism. For example, by performing operations at one time, a group of objects can be authorized, e.g., all functions, and all tables beginning with "taobao".

The Policy authorization may have restricted conditions. For example, the authorization may only be effective within a designated time period, the authorization may only be effective when a requester initiates a request from a designated IP address, or the user may be only permitted to use SQL (Structured Query Language) (instead of other types of tasks) to access a certain table.

The Policy authorization mechanism may use an Access Policy language to describe the authorization. To describe an ODPS access policy language, a simple application instance of using Project Policy authorization is given below:

Scenario description: a user alice@aliyun.com is authorized to submit a request only from the IP segment of "10.32.180.0~23" before the time point of "2013-11-11 23:59:59", is only permitted to perform operations of CreateInstance, CreateTable, and List in the project space test_project, and is prohibited from deleting any table in the test_project.

For example:
{
"Version": "1",
"Statement":
[{
"Effect":"Allow",
"Principal":"ALIYUN$alice@aliyun.com",
"Action":["rodps:CreateTable","odps:CreateInstance", "odps:List"],
"Resource":"acs:odps:*:projects/test_project",
"Condition":{
    "DateLessThan":{
        "acs:CurrentTime":"2013-11-11T23:59:59Z"
    },
    "IpAddress":{
        "acs:SourceIp":"10.32.180.0/23"
    }
}
},
{
"Effect":"Deny",
"Principal":"ALIYUN$alice@aliyun.com",
"Action":"odps:Drop",
"Resource":"acs:odps:*:projects/test_project/tables/*"
}]
}

In some embodiments of the present application, a dedicated account for production tasks in the production environment needs to enable the dedicated account to read and write all tables in the production environment, while satisfying a minimum authorization principle (for example, cannot possess an authorization of performing management operations).

The minimum authorization principle is also one of the basic principles for safety design. The minimum authorization principle requests the system to only give necessary authorizations to a body, instead of over-authorization. This can effectively reduce the possibilities of errors in a system, network, application, and database. For example, in a Linux system, a good operation habit is to use a common account to log into the system, and when operations requesting a root authorization is needed, operations by means of a sudo command is completed. This can largely reduce risks caused by mis-operations. Further, the consequences of a common account being stolen are completely different from that of a root account.

II. Under the Situation of Cross-Project-Space Authorization (Occurring Over Project Space A and Project Space B in FIG. 5):

The cross-project-space authorization may include three types, namely, an AA type, an AB type, and an ABC type.

1. Cross-Project-Space Authorization (AA/AB)

A source project may compile data into data packages and authorizes the data packages to a target project. When an administrator of the source project creates a data package, it may maintain a mapping relation between the data package and the table.

An administrator of the target project may perform secondary authorization in the project space.

2. Cross-Project-Space Authorization (ABC)

The source project authorizes each table to the target project by view.

The view can be created in the target project, for example, as shown in the production project of project space A. During a bottom level implementation, a source table, e.g., the source table illustrated in FIG. 4, and an authorization relation table may need to be added to achieve row-level authorization to the table.

The row-level authorization means that, in the ABC type, one table may have 1 million rows, but only a part of them can be authorized (for example, 100 thousands rows or 200 thousands rows). Thus, another authorization relation table (for example, merchants subscribed to an App of a certain IS V) needs to be integrated, to build a view to only authorize records in rows that satisfy a designated condition (the merchant identifications, e.g., merchant ID, in the record of the row are contained in the merchant ID list who subscribed the App).

In some embodiments of the present application, under the situation that the data authorization is clearly divided into a hierarchical structure according to the project space, when the user needs to access the data in the project space, the user's access authorization can be determined according to a project space of the data and a project space of the data, to provide corresponding accesses to the user, The following effects can be achieved by applying the embodiments of the present application:

1) The unified authorization flow can satisfy various demand scenarios of both a public cloud and a private cloud. After the authorization is determined, when a user accesses the data in the project space, accessing services can be provided to the user according to the user's access authorization.

2) Some embodiments of the present application support intra-project-space data authorization, such as an A type, and many services types of inter-project-space data authorization, for example, the AA/AB/ABC type. Based on the project space, the data packages can be properly turned into a hierarchical structure, which breaks up the complicated mesh-type data authorization structure in the prior art. Therefore, when the user accesses the data in the project space, it can quickly determine the user's access authorization, without the participation of a project administrator, thereby enhancing the processing efficiency of the data transaction platform.

The methods above may be described as a combination of a series of actions. However, persons skilled in the art shall know that, the embodiments of the present application are not restricted by the sequence of the described actions. According to the embodiments of the present application, some steps may be performed in another different sequence or performed simultaneously. Next, persons skilled in the art shall know that, the embodiments described in the specifications all belong to preferred embodiments, and the involved actions are not essential for the embodiments of the present application.

Figure 6:
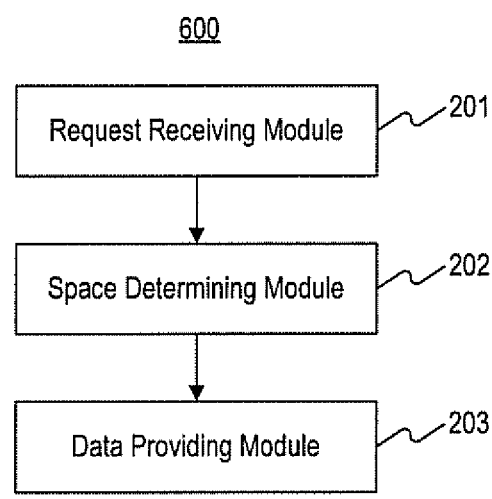
FIG. 6 is a block diagram of an apparatus for data access under a cloud computing environment, consistent with embodiments of the present disclosure.

FIG. 6 is a block diagram of an apparatus 600 for data access under a cloud computing environment, consistent with embodiments of the present disclosure. The cloud computing environment may include one or more service object spaces, and the one or more service object spaces respectively store data packages. The apparatus 600 may include the following modules:

a request receiving module 201 that, in a certain service object space, receives a request of a user for accessing a data package, the request including a user identification of the user; and a space determining module 202 that determines a service object space of the data package corresponding to the request.

In some embodiments of the present application, the data package includes an internal data package of the service object space and an external data package of the service object space. The space determining module 202 may include the following sub-modules:

a data package determining sub-module that determines whether the data package corresponding to the request is a data package of a current service object space; if yes, the data package determining sub-module invokes a first determining sub-module; otherwise, the data package determining sub-module invokes a second determining sub-module;

the first determining sub-module that determines the data package corresponding to the request to be an internal data package of the service object space; and the second determining sub-module that determines the data package corresponding to the request to be an external data package of the service object space.

a data providing module 203 that provides the data package to the user according to the service object space of the data package and the user identification.

In some embodiments, the one or more service object spaces may include one or more service object types. The data packages in the one or more service object spaces may have corresponding service object types. Based on the user identification and the service object types, a first access authorization can be configured. The data providing module 203 may include the following sub-modules:

a first access authorization determining sub-module that, if the data package is an internal data package of the service object space, uses the user identification to determine that the user has a first access authorization;

a service object type determining sub-module that determines a service object type corresponding to the internal data package of the service object space; and a first data providing sub-module that, under the service object type, uses the first access authorization to provide the internal data package of the service object space to the user.

In some embodiments of the present application, the service object type includes a development type service object and a production type service object. The first access authorization in the development type service object includes: a shared-type authorization and an isolated-type authorization. The first access authorization includes: reading, writing, and management. The first data providing sub-module includes:

a shared authorization providing unit that, under the development type service object, if the user's access authorization is a shared-type authorization, permits the user to read/write the internal data package of the development type service object;

an isolated authorization providing unit that, under the development type service object, if the user's access authorization is an isolated-type authorization, permits the user to read/write a designated internal data package of the development type service object; and a restricted authorization providing unit that, under the production type service object, permits the user to read/write an internal data package of the development type service object, but prohibits the user from managing an internal data package of the development type service object.

In some embodiments of the present application, directed to the user identification, a designated access authorization can be configured. The data providing module 203 may include the following sub-modules:

a designated access authorization determining sub-module that, if the data package is an external data package of the service object space, uses the user identification to determine that the user has a designated access authorization; and a designated data providing sub-module that uses the designated access authorization to provide the external data package of the service object space to the user.

In some embodiments of the present application, an external data package of the service object space includes a designated field, and the external data package of the service object space can be provided by a data provider. The second data providing sub-module may include the following units:

a field access request receiving unit that receives a field access request for an external data package of the service object space;

an approve request sending unit that uses the access authorization to send an approval request of the field access request to a data provider of the external data package of the service object space;

an access permitting unit that, if receiving an approval to the approval request from the data provider, permits the user to access the external data package; and an access prohibiting unit that, if receiving a rejection to the approval request from the data provider, prohibits the user from accessing the external data package.

In some embodiments of the present application, a corresponding subject is configured for an external data package of the service object space. Based on the user identification, the subject, and/or a preset authorization relation table, a second access authorization can be configured. The data providing module 203 may include the following sub-modules:

a second access authorization determining sub-module that, if the data package is an external data package of the service object space, uses the user identification to determine that the user has a second access authorization; and a second data providing sub-module that uses the second access authorization to provide an external data package of the service object space to the user.

The apparatus embodiments may be similar to the method embodiments, so that the apparatus embodiments are described in a simplified way, and relevant parts can be obtained with reference to the corresponding parts in the method embodiments.

A person skilled in the art can further understand that, various exemplary logic blocks, modules, circuits, and algorithm steps described with reference to the disclosure herein may be implemented as electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more tangible and/or non-transitory computer-readable storage media containing computer-readable program codes. Common forms of non-transitory computer readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable storage medium includes non-volatile and volatile media, and removable and non-removable media, wherein information storage can be implemented with any method or technology. Information may be modules of computer-readable instructions, data structures and programs, or other data. Examples of a computer-storage medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for data access in a cloud computing environment. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A data access method in a cloud computing environment including one or more service object spaces, comprising:
    receiving a request of a user for accessing a data package, wherein the request includes a user identification;
    determining, among the one or more service object spaces, a service object space of the data package corresponding to the request; and
    providing the data package to the user according to the service object space of the data package and the user identification, wherein:
        the data package comprises an internal data package of the service object space and an external data package of the service object space, and the external data package is used among the one or more service object spaces, and
        providing the data package to the user according to the service object space of the data package and the user identification comprises:
            using the user identification to determine that the user has a designated access authorization configured based on the user identification, and
            using the designated access authorization to provide the external data package of the service object space to the user.

2. The method according to claim 1, wherein:
determining the service object space of the data package corresponding to the request further comprises:
    determining whether the data package corresponding to the request is a data package of a current service object space,
    in response to the data package corresponding to the request being the data package of the current service object space, determining that the data package corresponding to the request is the internal data package of the service object space, and
    in response to the data package corresponding to the request being not the data package of the current service object space, determining that the data package corresponding to the request is the external data package of the service object space.

3. The method according to claim 2, wherein:
the service object space comprises one or more service object types corresponding to the data package;
a first access authorization is determined based on the user identification and the service object types; and
providing the data package to the user according to the service object space of the data package and the user identification comprises:
    in response to the data package being the internal data package of the service object space, using the user identification to determine that the user has the first access authorization;
    determining a service object type corresponding to the internal data package of the service object space; and
    under the service object type, using the first access authorization to provide the internal data package of the service object space to the user.

4. The method according to claim 3, wherein:
the service object type comprises a development type service object and a production type service object;
a first access authorization in the development type service object comprises: a shared-type authorization and an isolated-type authorization;
the first access authorization comprises: reading, writing, and management; and
under the service object type, using the first access authorization to provide the internal data package of the service object space to the user comprises:
    under the development type service object, in response to the user's access authorization being a shared-type authorization, permitting the user to read/write the internal data package of the development type service object;
    under the development type service object, in response to the user's access authorization being an isolated-type authorization, permitting the user to read/write a designated internal data package of the development type service object; and
    under the production type service object, permitting the user to read/write the internal data package of the development type service object, but prohibiting the user from managing the internal data package of the development type service object.

5. The method according to claim 1, wherein:
the external data package of the service object space comprises a designated field;
the external data package of the service object space is provided by a data provider; and
using the designated access authorization to provide the external data package of the service object space to the user comprises:
    receiving a field access request for the external data package of the service object space;
    using the access authorization to send an approval request, based on the field access request, to the data provider;
    in response to receiving an approval to the approval request from the data provider, permitting the user to access the external data package; and
    in response to receiving a rejection to the approval request from the data provider, prohibiting the user from accessing the external data package.

6. An apparatus for accessing data in a cloud computing environment including one or more service object spaces, comprising:
 a memory storing instructions; and
 one or more processors configured to execute the set of instructions to cause the apparatus to perform:
  receiving a request of a user for accessing a data package, wherein the request includes a user identification;
  determining, among the one or more service object spaces, a service object space of the data package corresponding to the request; and
  providing the data package to the user according to the service object space of the data package and the user identification, wherein:
   the data package comprises an internal data package of the service object space and an external data package of the service object space, and the external data package is used among the one or more service object spaces, and
   in providing the data package to the user, the one or more processors are further configured to execute the set of instructions to cause the apparatus to perform:
    using the user identification to determine that the user has a designated access authorization configured based on the user identification, and
    using the designated access authorization to provide the external data package of the service object space to the user.

7. The apparatus according to claim 6, wherein the one or more processors are further configured to execute the set of instructions to cause the apparatus to perform:
 if the data package corresponding to the request is determined to be the data package of the current service object space, determining that the data package corresponding to the request is the internal data package of the service object space, and
 if the data package corresponding to the request is determined to not be the data package of the current service object space, determining that the data package corresponding to the request is the external data package of the service object space.

8. The apparatus according to claim 7, wherein:
 the service object space comprises one or more service object types corresponding to the data package;
 a first access authorization is determined based on the user identification and the service object types; and
 the one or more processors are further configured to execute the set of instructions to cause the apparatus to perform:
  if the data package is the internal data package of the service object space, using the user identification to determine that the user has the first access authorization;
  determining a service object type corresponding to the internal data package of the service object space; and
  under the service object type, using the first access authorization to provide the internal data package of the service object space to the user.

9. The apparatus to claim 8, wherein:
 the service object type comprises a development type service object and a production type service object;
 a first access authorization in the development type service object comprises: a shared-type authorization and an isolated-type authorization;
 the first access authorization comprises: reading, writing, and management; and
 the one or more processors are further configured to execute the set of instructions to cause the apparatus to perform:
  under the development type service object, if the user's access authorization is a shared-type authorization, permitting the user to read/write the internal data package of the development type service object;
  under the development type service object, if the user's access authorization is an isolated-type authorization, permitting the user to read/write a designated internal data package of the development type service object; and
  under the production type service object, permitting the user to read/write the internal data package of the development type service object, but prohibiting the user from managing the internal data package of the development type service object.

10. The apparatus according to claim 6, wherein:
 the external data package of the service object space comprises a designated field;
 the external data package of the service object space is provided by a data provider; and
 the one or more processors are further configured to execute the set of instructions to cause the apparatus to perform:
  receiving a field access request for the external data package of the service object space;
  using the access authorization to send an approval request, based on the field access request, to the data provider;
  if an approval to the approval request is received from the data provider, permitting the user to access the external data package; and
  if receiving a rejection to the approval request is received from the data provider, prohibiting the user from accessing the external data package.

11. The apparatus according to claim 6, wherein:
 a subject is configured for an external data package of the service object space;
 a second access authorization is configured based on at least one of the user identification, the subject, or a preset authorization relation table; and
 the one or more processors are further configured to execute the set of instructions to cause the apparatus to perform:
  if the data package is the external data package of the service object space, using the user identification to determine that the user has the second access authorization; and
  using the second access authorization to provide the external data package of the service object space to the user.

12. A non-transitory computer readable medium that stores a set of instructions that are executable by at least one processor of a computer system to cause the computer system to perform a method for accessing data in a cloud computing environment including one or more service object spaces, the method comprising:
 receiving a request of a user for accessing a data package, wherein the request includes a user identification;
 determining, among the one or more service object spaces, a service object space of the data package corresponding to the request; and providing the data package to the user according to the service object space of the data package and the user identification, wherein:
  the data package comprises an internal data package of the service object space and an external data package of the service object space, and the external data package is used among the one or more service object spaces, and
  providing the data package to the user according to the service object space of the data package and the user identification comprises:
    using the user identification to determine that the user has a designated access authorization configured based on the user identification, and
    using the designated access authorization to provide the external data package of the service object space to the user.

13. The non-transitory computer readable medium according to claim 12, wherein:
  determining the service object space of the data package corresponding to the request further comprises:
  determining whether the data package corresponding to the request is a data package of a current service object space,
  in response to the data package corresponding to the request being the data package of the current service object space, determining that the data package corresponding to the request is the internal data package of the service object space, and
  in response to the data package corresponding to the request being not the data package of the current service object space, determining that the data package corresponding to the request is the external data package of the service object space.

14. The non-transitory computer readable medium according to claim 13, wherein:
  the service object space comprises one or more service object types corresponding to the data package;
  a first access authorization is determined based on the user identification and the service object types; and
  providing the data package to the user according to the service object space of the data package and the user identification comprises:
    in response to the data package being the internal data package of the service object space, using the user identification to determine that the user has the first access authorization;
    determining a service object type corresponding to the internal data package of the service object space; and
    under the service object type, using the first access authorization to provide the internal data package of the service object space to the user.

15. The non-transitory computer readable medium according to claim 14, wherein:
  the service object type comprises a development type service object and a production type service object;
  a first access authorization in the development type service object comprises: a shared-type authorization and an isolated-type authorization;
  the first access authorization comprises: reading, writing, and management; and under the service object type, using the first access authorization to provide the internal data package of the service object space to the user comprises:
  under the development type service object, in response to the user's access authorization being a shared-type authorization, permitting the user to read/write the internal data package of the development type service object;
  under the development type service object, in response to the user's access authorization being an isolated-type authorization, permitting the user to read/write a designated internal data package of the development type service object; and
  under the production type service object, permitting the user to read/write the internal data package of the development type service object, but prohibiting the user from managing the internal data package of the development type service object.

16. The non-transitory computer readable medium according to claim 12, wherein:
  the external data package of the service object space comprises a designated field;
  the external data package of the service object space is provided by a data provider; and
  using the designated access authorization to provide the external data package of the service object space to the user comprises:
    receiving a field access request for the external data package of the service object space;
    using the access authorization to send an approval request, based on the field access request, to the data provider;
    in response to receiving an approval to the approval request from the data provider, permitting the user to access the external data package; and
    in response to receiving a rejection to the approval request from the data provider, prohibiting the user from accessing the external data package.

17. The non-transitory computer readable medium according to claim 12, wherein:
  a subject is configured for an external data package of the service object space;
  a second access authorization is configured based on at least one of the user identification, the subject, or a preset authorization relation table; and
  providing the data package to the user according to the service object space of the data package and the user identification comprises:
    in response to the data package being the external data package of the service object space, using the user identification to determine that the user has the second access authorization; and
    using the second access authorization to provide the external data package of the service object space to the user.

* * * * *